United States Patent
Landers

Patent Number: 6,125,949
Date of Patent: *Oct. 3, 2000

[54] METHOD OF AND APPARATUS FOR HORIZONTAL WELL DRILLING

[76] Inventor: Carl Landers, 141 S. Union St., Madisonville, Ky. 42431

[*] Notice: This patent is subject to a terminal disclaimer.

[21] Appl. No.: 09/098,623

[22] Filed: Jun. 17, 1998

Related U.S. Application Data

[63] Continuation-in-part of application No. 08/624,438, filed as application No. PCT/US94/10896, Sep. 26, 1994, which is a continuation-in-part of application No. 08/131,526, Oct. 1, 1993, Pat. No. 5,413,184.

[51] Int. Cl.$^7$ ......................................................... E21B 7/08
[52] U.S. Cl. .............................. 175/62; 175/75; 175/424
[58] Field of Search .................................. 175/61, 62, 75, 175/420, 80, 89; 299/16, 17; 166/117.6

[56] References Cited

U.S. PATENT DOCUMENTS

| | | |
|---|---|---|
| 2,258,001 | 10/1941 | Chamberlain . |
| 2,381,929 | 8/1945 | Schlumberger . |
| 2,441,881 | 5/1948 | Hays . |
| 2,516,421 | 7/1950 | Robertson . |
| 2,526,695 | 10/1950 | Schlumberger . |
| 2,539,047 | 1/1951 | Arutunoff . |
| 2,783,972 | 3/1957 | Fehlmann . |
| 3,301,337 | 1/1967 | Vaughn et al. . |
| 4,007,797 | 2/1977 | Jeter . |
| 4,051,908 | 10/1977 | Driver . |
| 4,185,705 | 1/1980 | Bullard . |
| 4,527,639 | 7/1985 | Dickinson, III et al. ................. 175/61 |
| 4,658,916 | 4/1987 | Bond . |
| 4,765,173 | 8/1988 | Schellstede . |
| 4,790,384 | 12/1988 | Schellstede et al. . |
| 5,107,943 | 4/1992 | McQueen et al. . |
| 5,327,970 | 7/1994 | McQueen . |
| 5,439,066 | 8/1995 | Gipson ..................................... 175/61 |

Primary Examiner—William Neuder
Attorney, Agent, or Firm—Charles G. Lamb; Middleton & Reutlinger

[57] ABSTRACT

A method and apparatus for penetrating a well casing and surrounding earth strata includes the insertion of a flexible shaft having a ball cutter on an end thereof into upset tubing within a well casing. The upset tubing is provided with an elbow at its lower extremity for receiving the ball cutter therein. The flexible shaft is then rotated and the ball cutter cuts a hole in the well casing. The flexible shaft and ball cutter are then removed and a flexible tube having a nozzle blaster on an end thereof is then inserted into the upset tubing in the channel. A fluid of surfactant and water at high pressure is then pumped into the tube wherein the high pressure fluid passes through orifice in the spiral drill thereby cutting an extension into the previously cut channel. The tube is continually feed into the channel as the high pressure fluid continues to blast away the earth's strata. The channel is then cut a preselected distance from the well up to 200 feet and beyond.

39 Claims, 7 Drawing Sheets

METHOD OF AND APPARATUS FOR HORIZONTAL WELL DRILLING

CROSS REFERENCE TO RELATED APPLICATIONS

This is a continuation-in-part of U.S. Ser. No. 08/624,438 filed Apr. 1, 1996, which is a 371 of PCT/US94/10896 filed Sep. 26, 1994, which is a continuation-in-part of U.S. Ser. No. 08/131,526 filed Oct. 1, 1993 now U.S. Pat. No. 5,413,184.

BACKGROUND OF THE INVENTION

This invention relates to a method and apparatus for horizontal drilling into the earth strata surrounding a well casing. More specifically, the present invention relates to a method and apparatus for drilling through the walls of a vertically extending well casing at a 90° angle to provide horizontal drilling into the earth's strata for a substantial distance radially from the vertically extending well casing.

Oil and gas wells are drilled by the use of rotary drilling equipment vertically into the earth's strata. The vertically extending well holes generally include a casing usually of mild steel in the neighborhood of 4½ inch (11.4 cm) to 8 inch (20.3 cm) in diameter which define the cross-sectional area of a well for transportation of the oil and gas upwardly to the earth's surface. However, these vertically extending wells are only useful for removing oil and gas from the general vicinity adjacent to and directly underneath the terminating downward end of the well. Thus, not all of the oil and gas in the pockets or formations in the earth's strata, at the location of the well depth, can be removed. Therefore, it is necessary to either make other vertical drillings parallel and close to the first drill, which is timely and costly, or provide means to extend the original well in a radial or horizontal direction. The most common means for horizontal extension of the well has been to drill angularly through the well casing at a first 45° angle for a short distance and then to turn the drill and drill at a second 45° angle thereby making a full 90° angular or horizontal cut from the vertically extending well. These horizontal drills have proved useful for extending the well horizontally. However, most of these horizontally extending cuts have proved to be relatively expensive.

There have been a number of patents issued which teach a number of different ideas for accomplishing horizontal drillings or cuttings into the earth's strata surrounding an existing well, but, again, most of these have proved to be costly and have also not produced the desired results. U.S. Pat. No. 4,640,362 teaches a method of penetrating a well casing and surrounding earth strata with the use of a punch member for cutting through a well casing wherein the punch member includes a retractable jet nozzle means therein for penetrating the surrounding earth's strata after the punch member has cut through the casing. Moreover, U.S. Pat. No. 4,185,705 teaches a well perforating tool for drilling holes in a well casing which includes an upset tubing with a downward terminating end curving laterally away from its longitudinal axis and terminating in a threaded end portion that passes through a correspondingly shaped aperture formed in the wall of the well casing. Other patents which teach drilling components for horizontal extensions from vertically extending wells wherein hydraulic fluid directing nozzles are used in the drilling operations include U.S. Pat. No. 2,271,005; U.S. Pat. No. 2,345,816; U.S. Pat. No. 3,838,736; U.S. Pat. No. 3,873,156; and, U.S. Pat. No. 4,168,752.

SUMMARY OF THE INVENTION

The present invention is directed to a method and apparatus for penetrating a well casing and surrounding earth strata. Furthermore, the present invention is directed to a method of penetrating a well casing and surrounding earth strata utilizing a two-step process wherein a flexible shaft having a cutter or cutter head on one end thereof is used to make a cut through the well casing and the second step involves the use of a flexible tube having a nozzle blaster on the end thereof which is then inserted down the well casing into the cut and in combination with a high pressure fluid pumped through the flexible tube and out through the nozzle blaster, a horizontal extension through the cut can then be made up to a distance of more than 200 feet (61 m). The upset tubing can then be turned from the surface 90° to repeat the process in another direction. One can then cut another hole through the casing and repeat the process up to 4 directions on one level. Many levels can be opened with the same procedure. This invention has application in drilling oil, gas, or water, for example.

More particularly, the present invention is also directed to a method of penetrating a well casing and surrounding earth strata comprising the steps of inserting a flexible shaft having a cutting means on one end thereof into upset tubing in a well casing wherein the upset tubing is provided with an elbow at its terminating end; rotating said flexible shaft: and said cutting means thereby cutting a hole in said well casing and the earth's strata surrounding the well casing; removing the flexible shaft and the cutting means from the upset tubing; inserting a flexible tube having a nozzle blaster on an end thereof into the upset tubing and out through the cut in the well casing and the earth's strata; and, pumping fluid at high pressure into the tubing and nozzle blaster thereby cutting an extension of the cut into the earth's strata.

Even more particularly the present invention is directed to a unique elbow used in combination with a ball cutter in an apparatus for cutting an opening in a well casing.

Also, the present invention is directed to a unique nozzle or nozzle blaster used to cut openings in the well casings.

DESCRIPTION OF THE PREFERRED EMBODIMENT

Figure 1A:
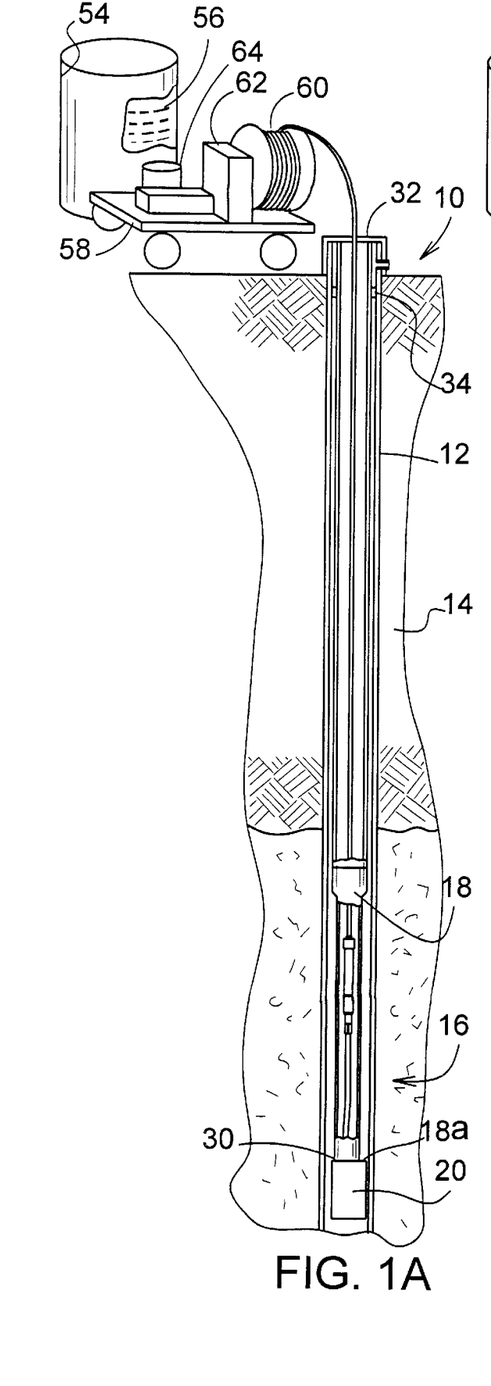
FIG. 1A is a side elevational view showing a gas or oil well, in section, and the down hole apparatus of the present invention being used in cutting an opening in the well casing.
Figure 2:
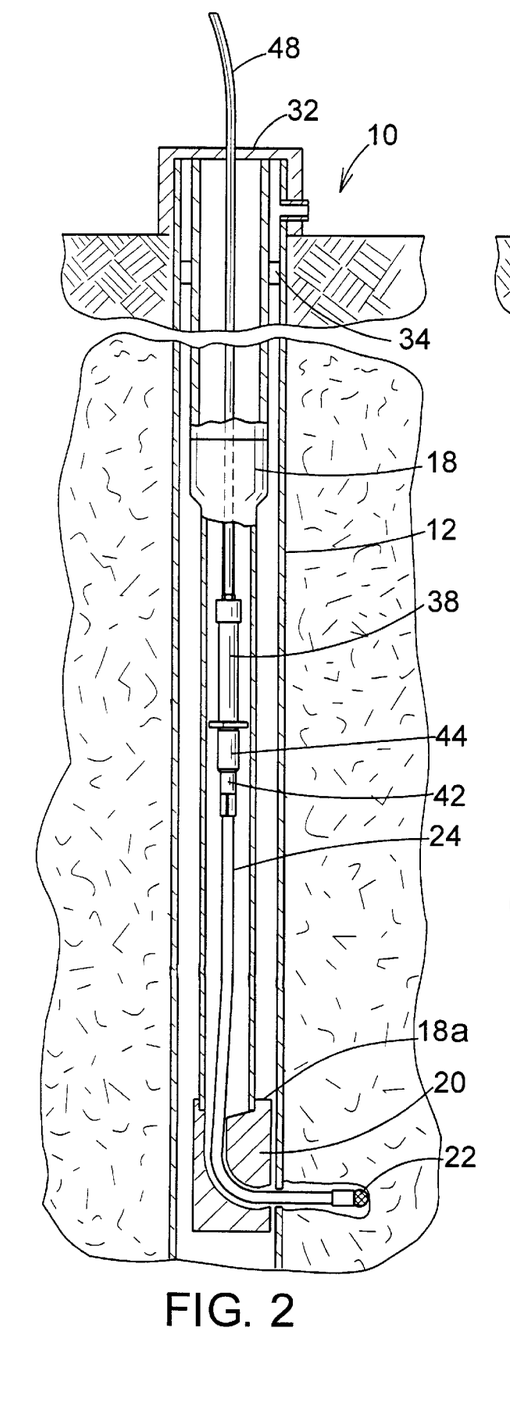
FIG. 2 is an enlarged sectional view of FIG. 1A but with emphasis on the lower portion of the well where a cut into the hole casing is to be made.
Figure 3:
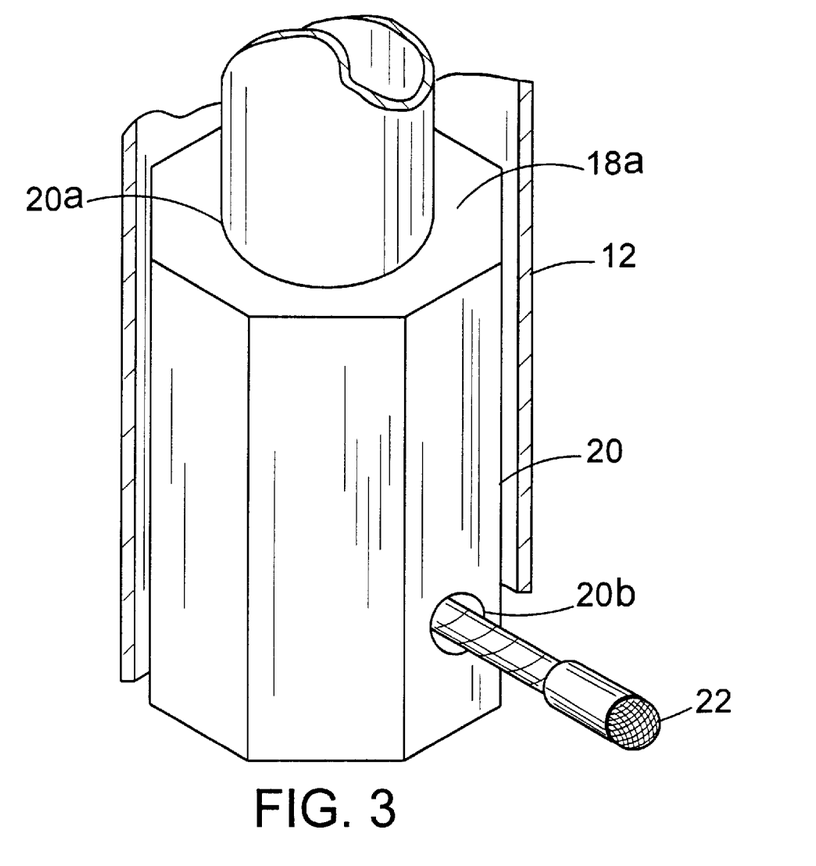
FIG. 3 is an enlarged perspective view of the cutting ends of the apparatus of FIG. 2.

FIG. 1A and FIG. 2 of the drawing shows the employment of a preferred embodiment of the invention in an oil well 10 having a well casing 12 which extends downwardly through the earth's strata 14 into a pocket of oil or gas. FIG. 1A shows the apparatus 16 used in making a cut through the well casing 12.

The apparatus 16 includes upset tubing 18 which extends downwardly through the well casing 12 a preselected distance, the preselected distance being the distance to which a cut into the well casing 12 is to be made and the positioning of the terminating end 18*a* for the horizontal cut into the earth's strata. The upset tubing 18 may be any upset tubing well known in the art, but at the terminating end 18*a* of the upset tubing 18 is an elbow 20 which is positioned to be rotated to a specific position within the well casing 12 for making the cut therethrough as well as to receive a ball cutter 22 and flexible shaft 24 therethrough. The elbow 20 is generally made from an octagonally-shaped block of metal which with an opening extending therethrough, the inlet 20*a* and outlet 20*b* being 90° to each other. Inlet 20*a* has a larger diameter than the outlet 20*b*. The upset tubing 18 has an O.D. less than the I.D. of the well casing 12 and is usually made of rolled steel. In a preferred embodiment, the upset tubing is metallic and the terminating end 18*a* is attached to the elbow 20 by welding at the location noted by the numeral 30. The upset tubing 18 is generally mounted onto the head of the well 32. Located at a down hole position just inside the well is a blow out preventer 34 which is generally well known in the oil and gas drilling art wherein blow out preventers are used to prevent the blow back of materials up through the upset tubing at the well head 32.

The ball cutter 22 is coupled to the flexible shaft 24 on one end and shaft 24 on its opposite end is coupled to a fluid driven motor 38 which is suspended down into the upset tubing 18. Fluid returns through exhaust vent on the motor 38 and then flows between flex tubing 48 and the tubing 18, carrying the fluid for the operation of the fluid driven motor 38. The fluid driven motor 38 is, for example, an Ingersol-Rand Model No. DLO 21B-5-P which is operable in response to 1000 psi (70.3 kilograms/sq cm) of hydraulic pressure as delivered through the fluid tube 48. Fluid driven motor 38 generally turns at 500 rpm.

However, in the present operation a reducer 42 is attached to the outlet shaft 44 of the motor 38 wherein the reducer 42 reduces the 500 rpm rotating speed down to generally between 40 to 60 rpm. One preferred ball cutter 22 is a tungsten carbide cutter with a roughened surface and in cutting through of the well casing 12 is designed to rotate at a relatively low speed, such as the 40 to 60 rpm noted previously. Operation of the ball cutter 22 of the present invention at a high rate of speed generally makes the cutting through the well casing 12 difficult to control and it has been found that with a rotatable speed of 40 to 60 rpm, the ball cutter can still make a cut in a relatively short period of time, such as in about 15 minutes through a well casing 12 which is ⅛ inch (3.2 mm) thick.

Figure 1B:
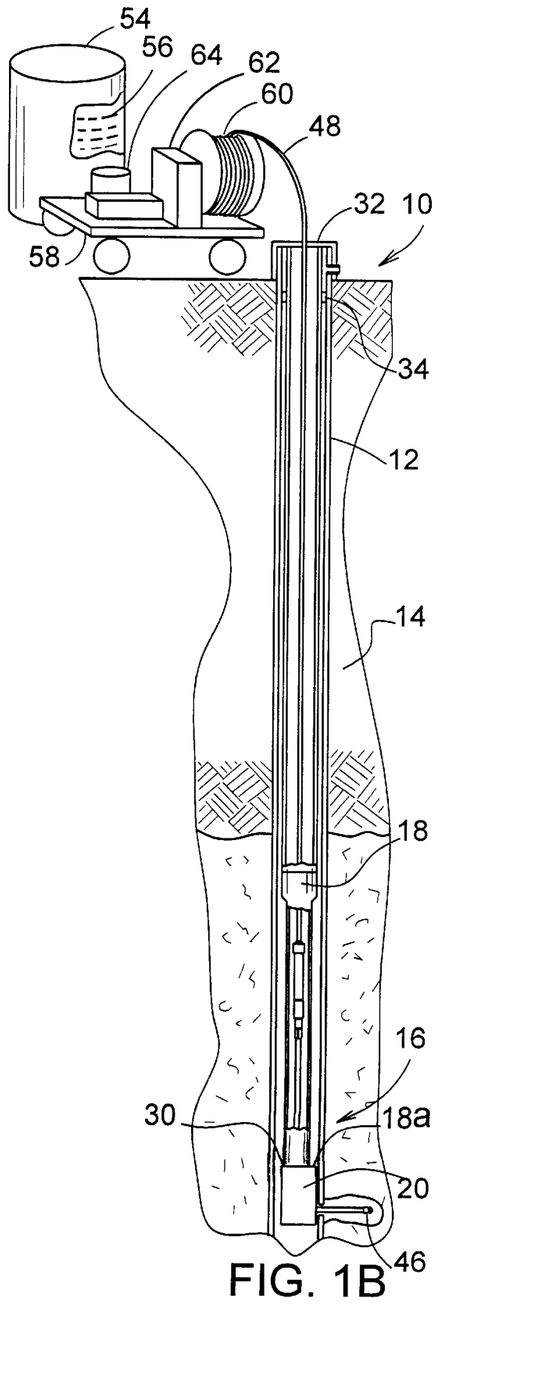
FIG. 1B is a side elevational view showing a gas or oil well, in section, and the down hole apparatus of the present invention being used in extending horizontally the cut in the earth's strata shown in FIG. 1A.
Figure 4:
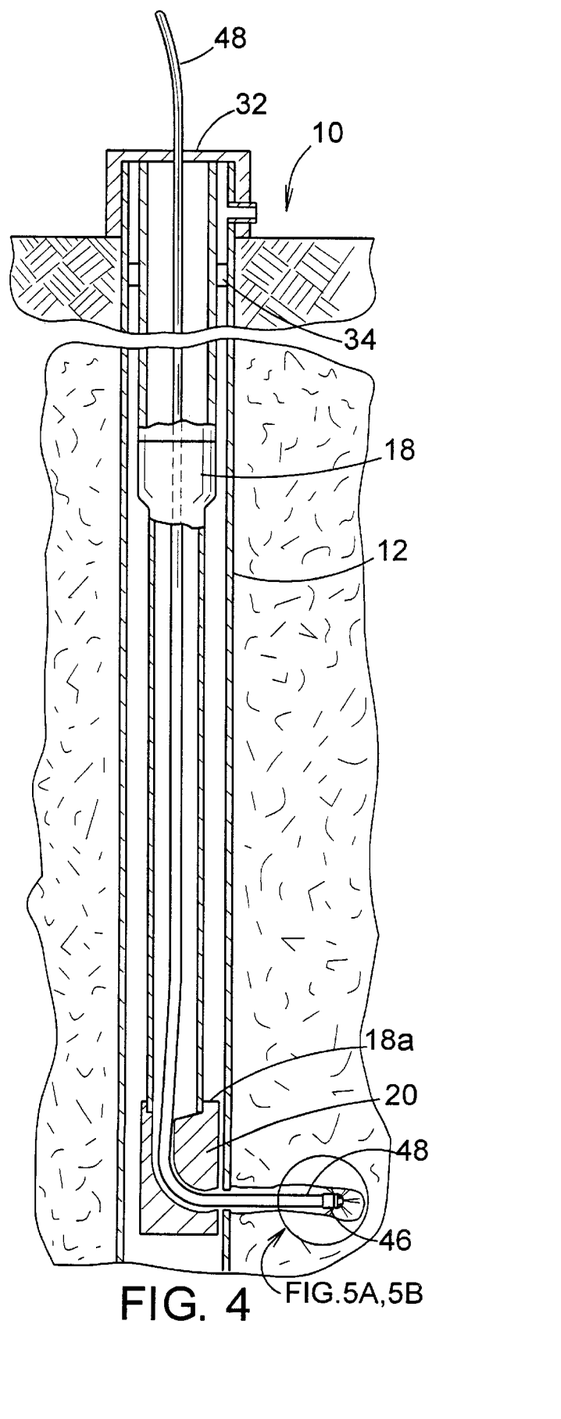
FIG. 4 is an enlarged elevational view of FIG. 1B with emphasis being placed on the lower end of the well to emphasize the apparatus utilized in drilling an extension into the earth's strata away from the well.
Figure 5A:
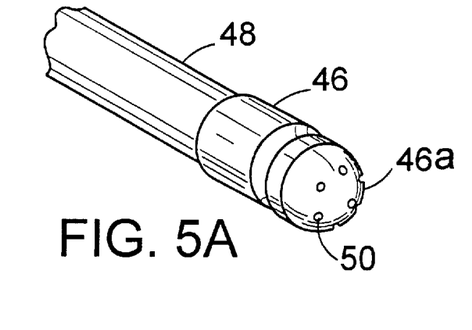
FIG. 5A is an enlarged perspective view of the cutting end of the apparatus of FIG. 4.
Figure 5B:
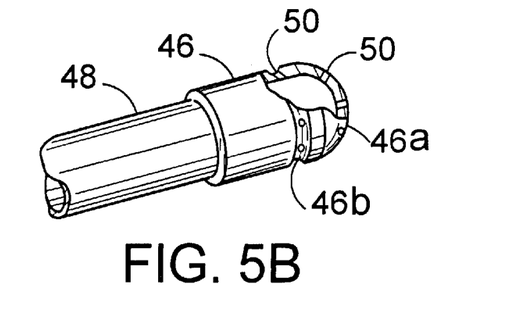
FIG. 5B is a perspective view of FIG. 5A with selected portions cut-away, and rotated 90°.

In FIG. 1B a preferred embodiment of the present invention is shown wherein a cut in the well casing 12 is utilized as the starting point for drilling a hole into the earth's strata 14 outwardly from the well casing 12. A nozzle blaster 46 is suspended to the oil well 10 wherein the nozzle blaster 46 is threadably attached to the end of a fluid tube 48. Fluid tube 48 may be of an elastomeric or metallic material, but must be capable of withstanding internal fluid pressures of up to and greater than 4000 psi (281 kgms/sq cm). One preferred tube is a flexible, seamless, stainless steel tubing approximately 0.25 inches (6.35 mm) I.D. and approximately 0.375 inches (9.53 mm) O.D. Alternatively, a flexible, seamless, stainless steel tubing approximately 0.5 inches (12.7 mm) O.D. can be utilized. As best shown in FIGS. 4, 5A, and 5B, the nozzle blaster 46 is provided with a plurality of apertures or nozzles 50 therein, the apertures 50 being dispersed uniformly over the conical portion 46*a* of the nozzle blaster. The apertures are positioned to provide openings from the inside of the nozzle blaster 46 so that fluid passing from the inside of the nozzle 46 is directed outwardly away from the well casing 12 at an angle, usually about 45°, from the longitudinal axis passing therethrough. In the base portion 46*b* of the conically shaped nozzle blaster 46, the apertures 50 are also disposed at an angle, usually about 45°, to the longitudinal axis to provide high pressure fluid inwardly towards the well casing 12 thereby keeping the channel or cut open as the nozzle 46 moves outwardly away from the well casing. In a preferred nozzle blaster 46, apertures 50 are approximately 0.026 inch (6.6 mm) in diameter. It has been found that in wells with old casings, it is possible with the use of a nozzle blaster to jet right through the casing into the formation without the use of a ball cutter. In a preferred nozzle blaster, identified by the numeral 246, and shown in FIGS. 11, 11A, 11B, AND 11C, nozzle blaster 246 is provided with usually three apertures or openings 250 spaced equidistance around the front conically shaped portion 246*a* of the nozzle blaster 246, the openings 250 being at an angle "y" from the longitudinal axis passing through the nozzle blaster 246. The angle "y" is usually about 45°. Also, nozzle blaster 246 is provided with usually three apertures or openings 252 spaced equidistance around the base portion 246*b* of the nozzle blaster 246, the openings 252 being at an angle "x" from the longitudinal axis passing through the nozzle blaster 246. The angle "x" is usually about 15°. Fluid flowing from and out through openings 250 blast the earth's strata usually in increments of about 2 inches lateral while fluid flowing from the rear facing openings 252 propel the nozzle blaster 246 forward. Also, the fluid from openings 252 clean the cut hole as the tubing is removed.

As best shown in FIG. 1B, the fluid tube 48 at its inlet end is in flow communication with a tank container 54 which includes fluid 56 therein. The container 54 is separate and free standing and tube 48 is coiled onto a rotatable drum 60 also mounted on the platform skid 58. The fluid tube 48 is rolled upon or unrolled from drum 60 for use within the oil well 10.

The fluid 56 in the container 54 is generally a mixture of a surfactant and water wherein the surfactant is generally from about 1 to 5% by weight of the total solution. In the drilling operation, the fluid 56 is generally heated in a heat exchanger 62 also mounted on the platform skid 58 which maintains the surfactant water solution in a heated condition. Generally, the temperature of the surfactant water solution is between about 130° F. (54° C.) and 160° F. (71° C.). And, the surfactant is generally selected from a group consisting of water wetters, oil wetters, and surfactants with a sodium salt. One preferred surfactant is a product manufactured by Climax Performance Materials Corporation under the trademark ACTRASOL-MY-75 which is a mixture of sulfonated soybean oil, a sodium salt, and a methyl ester of soybean oil.

Also provided on the platform skid 58 is a pump 64 which is, for example, Giant Industries, Model Number P450A which will produce a fluid discharge pressure of up to 5000 psi (352 kgms/sq cm), or Landers Horizontal Drill Pump which will produce a fluid discharge pressure of up to 10,000 psi (703 kgms/sq cm) or a Kerr Pump Model 3208B Mustang, or the like. Pump 64 mounted onto the platform skid 58 is in fluid communication with the fluid tube 48 for pumping the surfactant water solution 56 from the container 54 into the oil well 10 wherein the high pressure fluid 56 discharges through the openings in the nozzle blaster 46 at 3500 to 4000 psi (246 to 281 kgms/sq cm). And, with continual feeding of the tube 48 down through the upset tubing 18, a horizontal drill or cut into the earth's strata 14 in excess of 400 feet away from the well casing 12 is possible.

In operation, the upset tubing 18 having the elbow 20 on the end thereof is lowered into a well casing 12 to a preselected position therein, the position being determined as the location for a horizontal drill into the earth's strata 14. A fluid tube 48 having a fluid driven motor 38 on the terminating end thereof with a reducer 42, flexible shaft 24 and ball cutter 22 extending therefrom is lowered into the well casing 12 until the ball cutter 22 passes out through the elbow 20 until the ball cutter 22 is positioned adjacent to the inside of the well casing 12.

Fluid at approximately 1000 psi (70.3 kgms/sq cm) is pumped down through a fluid tube 48 wherein the fluid, which is generally a surfactant-water mixture 56 activates the fluid driven motor 38 and in turn the reducer 42. Reducer 42 turns the flexible shaft 24 thereby rotating the ball cutter 22 at approximately 20 to 30 rpm. Within about 15 minutes the ball cutter 22 cuts through the well casing 12 which is ⅛ inch (3.2 mm) in thickness. After the cut through the casing 12, flexible fluid tube 48 is continually lowered so the ball cutter 22 continues moving outwardly into the earth's strata for a preselected distance, generally a distance up to 12 inches (25.4 cm) and preferably about 1½ inches (3.8 cm) to 2 inches (5.1 cm). The 1½ inches (3.8 cm) is generally sufficient for the starting point for the horizontal drilling or extension of the pre-cut into the earth's strata. The ball cutter 22 is then removed from the upset tubing 18 and wound back up onto a drum 66 on the platform skid 58. The fluid tube 48, including the nozzle blaster 46 on the terminating end thereof, is then lowered down into the upset tubing 18 and is continued to be rolled off of the drum 60 until it extends through the elbow 20, through the opening in the well casing 12 which has been made previously by the ball cutter 22, and to the end of the pre-cut into the earth's strata 14 by ball cutter 22. When the nozzle blaster has reached the pre-cut distance from the well casing 12, pump 64 is turned on and the surfactant-water mixture 56 is then pumped at a pressure of about 6000 psi from the container 54 through the heat exchanger 62 down into the oil well 10 and out through the nozzle blaster 46. The high pressure fluid 56 is continually pumped and the tube 48 is continually unwound from the drum 60 until a preselected distance from the well casing 12 is obtained. The high pressure fluid spewing from the nozzle blaster 46 is capable of cutting through the earth's strata including limestone layers and other softer materials without delay and within 8 to 10 minutes can blast or cut horizontally at least 200 feet.

FIGS. 6A–8B show a second preferred apparatus 116 used in making a cut through the well casing 12. As with the embodiment of FIG. 1A, the apparatus 116 includes upset tubing 18 which extends downwardly through the well casing 12 a preselected distance, the preselected distance being the distance to which a cut into the well casing 12 is to be made and the positioning of the terminating end 18a for the horizontal cut into the earth's strata. At the terminating end 18a of the upset tubing 18 is elbow 20 which is positioned to be rotated to a specific position within the well casing 12 for making the cut therethrough as well as to receive a ball cutter 122 and flexible shaft 124 therethrough. Again, the terminating end 18a of upset tubing 18 is attached to elbow 20 by welding at the location noted by the numeral 30.

Figure 7:
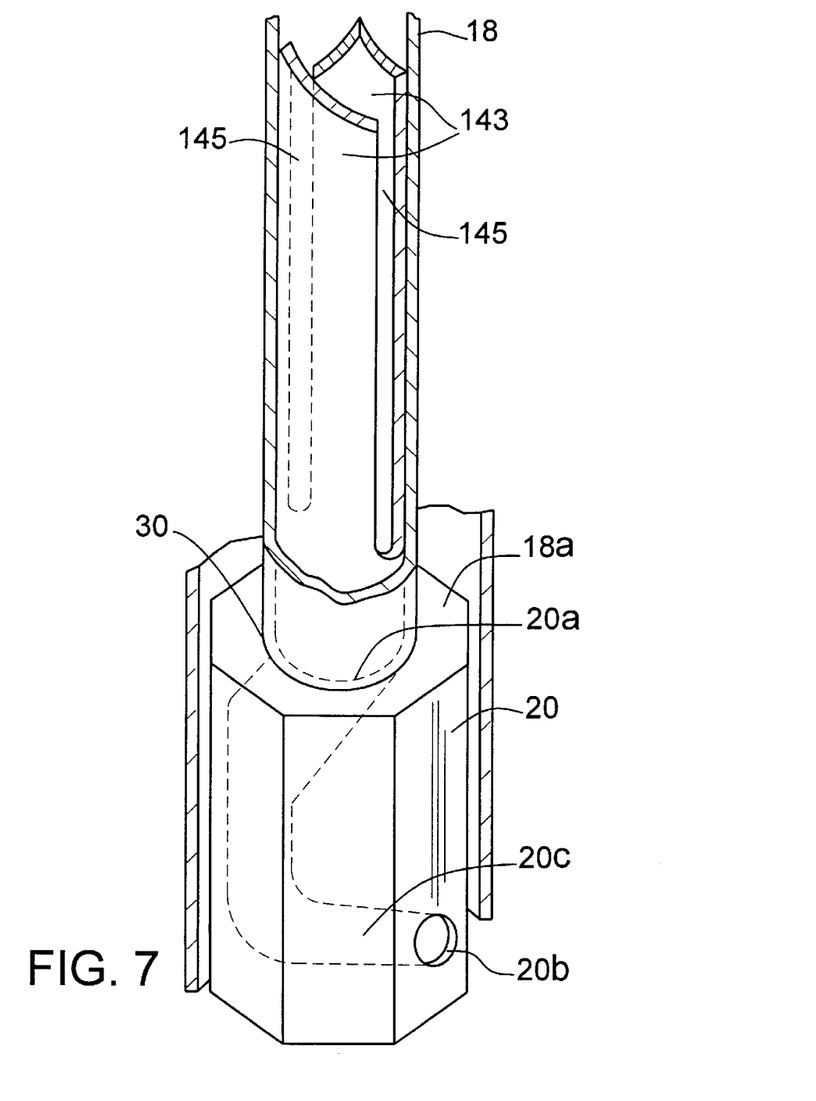
FIG. 7 shows the lower portion of the upset tubing and a preferred elbow of the present invention.
Figure 8A:
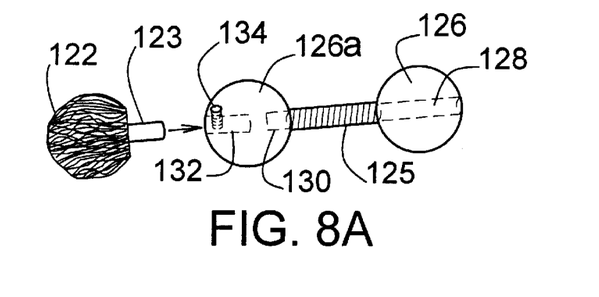
FIG. 8A shows an exploded view of a ball cutter connected to its operating means for the apparatus shown in FIG. 6A.
Figure 8B:
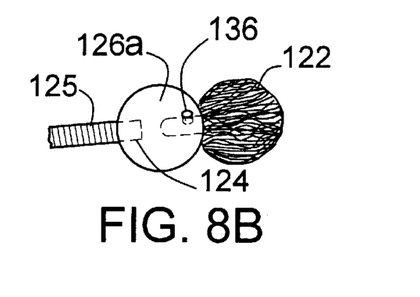
FIG. 8B shows the ball cutter of FIG. 8A connected for operation.

The elbow 20 has an inlet 20a and an outlet 20b being 90° to each other. Inlet 20a has a larger diameter than the outlet 20b.

Between inlet 20a and outlet 20b is a "bowed" channel 20c. This bow makes it easier for the cutter assembly, including cutter 122 and the flexible shaft 124 connecting to motor 138, as explained hereinafter, to make the 90° bend from inlet 20a to outlet 20b. The bottom portion of channel 20c has about a 5° upslope toward outlet 20b.

Figure 6A:
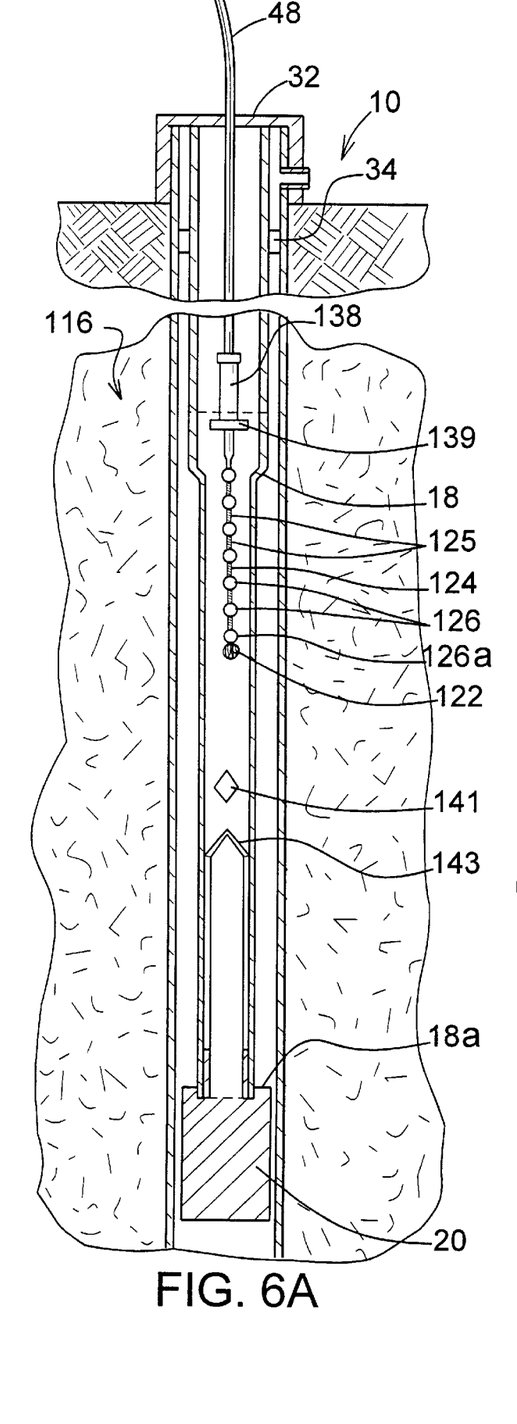
FIG. 6A is an enlarged sectional view similar to the view of FIG. 2, showing a second preferred apparatus for making a cut through a well casing, with emphasis on the lower portion of the well where the cut into the hole casing is to be made.
Figure 6B:
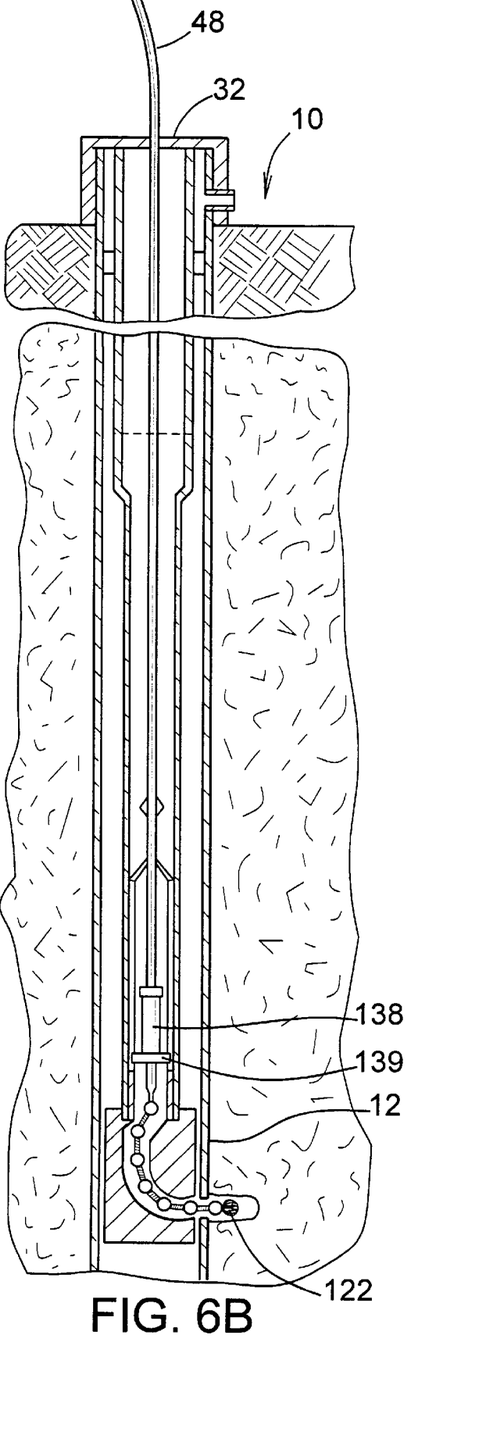
FIG. 6B is an enlarged sectional view similar to FIG. 6A, showing completion of a cut through the well casing.

The ball cutter 122 is shown having a shaft 123 extending therefrom. A plurality of preferably stainless steel ball bearings 126 are employed. FIGS. 6A and 6B show seven such balls 126. The endmost ball 126a has opposed bores 130 and 132 for receiving flexible shaft 124 and ball cutter shaft 123, respectively. A bore 134 connects to bore 132 and receives, for example, a threaded set screw 136 to securely retain ball cutter shaft 123 within bore 132. Flexible shaft 124, having for example a diameter of about 5/16 inch (7.9 mm), has one end secured within bore 132. For example, ball 126a can be hydraulically compressed to secure ball 126a onto shaft 124. Balls 126, other than endmost ball 126a, have diametric bores 128 therethrough, sized so that balls 126 will fit over flexible shaft 124. Springs 125 are placed over shaft 124 between the balls 126 to maintain spacing between each of the balls 126. The end of flexible shaft 124 opposite ball cutter 122 is coupled to a fluid driven motor 138 which is suspended down into the upset tubing 18. As with motor 38 of the first embodiment, fluid returns through exhaust vent on the motor 138 and then flows between flex tubing 48 and the tubing 18, and carries the fluid for the operation of the fluid driven motor 38. With this embodiment, the fluid driven motor 138 is, for example, a Micro Motor Model No. MMF0002, which is operable in response to 110 psi (7.7 kilograms/sq cm) of air pressure as delivered through the fluid tube 48. Fluid driven motor 138 generally turns at 23 rpm. Therefore, a reducer is not employed with this model. Ball cutter 122 can make a cut in a relatively short period of time, such as in about 15 minutes through a well casing 12 which is ¼ inch (6.4 mm) thick.

A motor detent insert 143 is secured within the lower portion of upset tubing 18. Motor detent insert 143 has diametrically opposed slots 145 which receive a horizontal detent wing 139 of motor 138. This prevents motor 138 from rotating during operation. For example, insert 143 can be about 12 inches (30.5 cm) in height. Attached within upset tubing 18 about 4 inches (10.2 cm) above insert 143 is a tipper 141. Tipper 141 serves to align horizontal detent wing 139 with diametrically opposed slots 145.

Figure 9A:
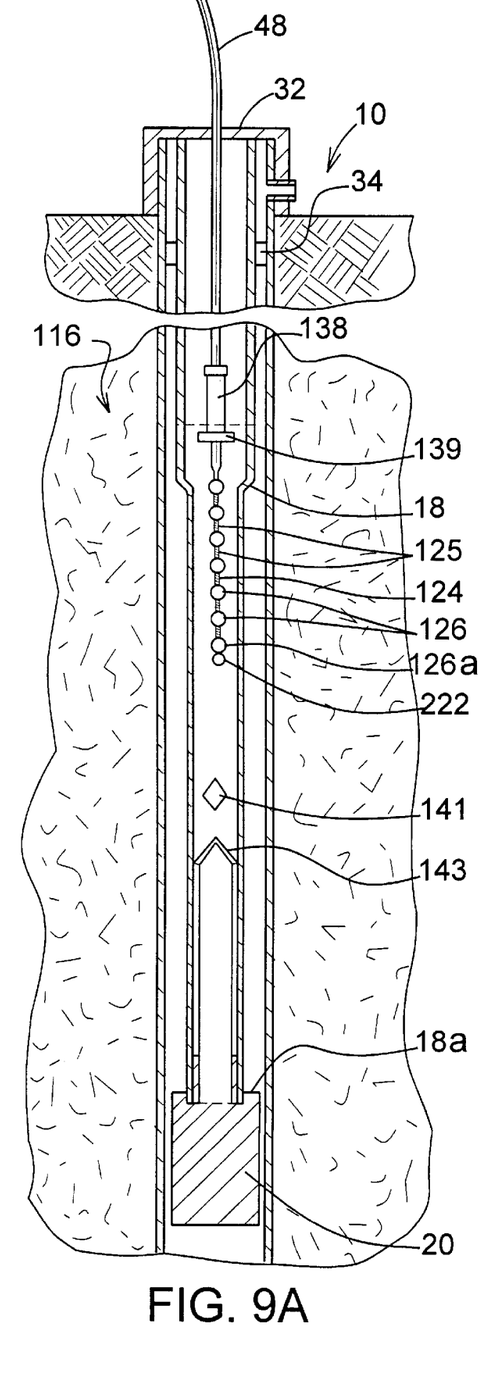
FIG. 9A is an enlarged sectional view showing a third preferred apparatus for making a cut through a well casing with emphasis on the lower portion of the well when the cut into the hole casing is to be made.
Figure 9B:
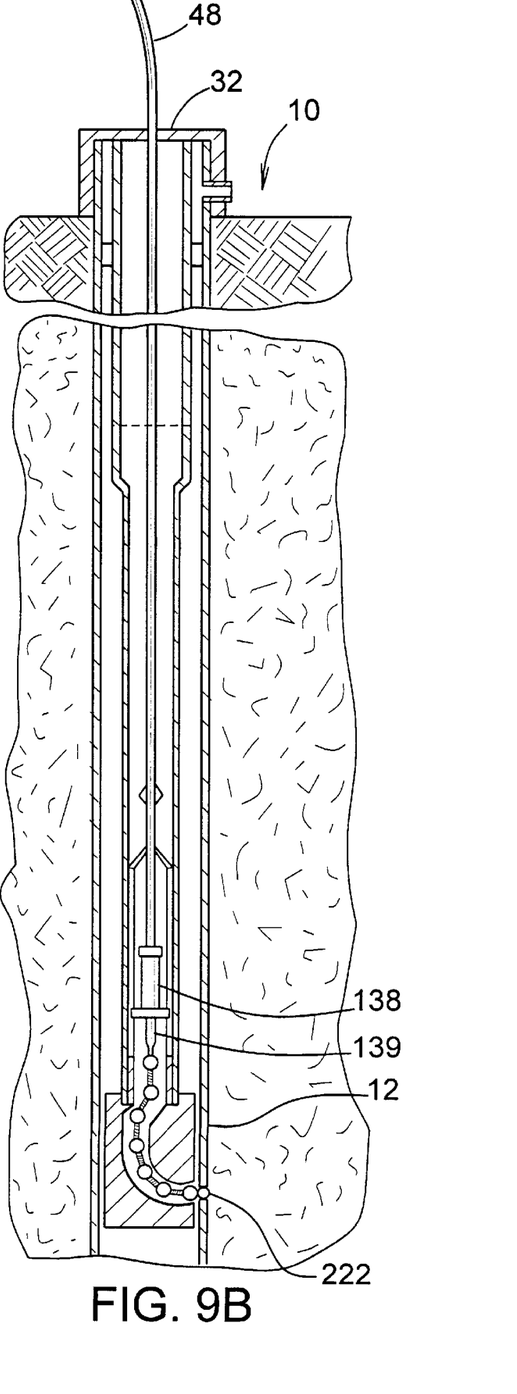
FIG. 9B is an enlarged sectional view of FIG. 9A showing the completion of the cut through the well casing.
Figure 10:
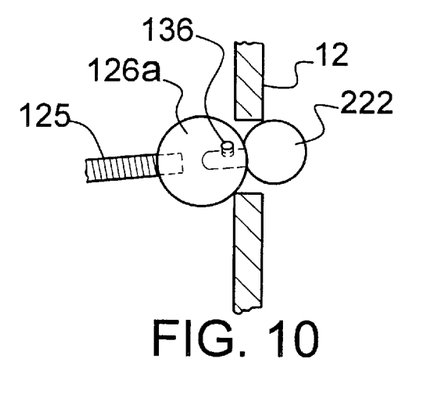
FIG. 10 shows the ball cutter of FIG. 9A connected for operation.
Figure 11:
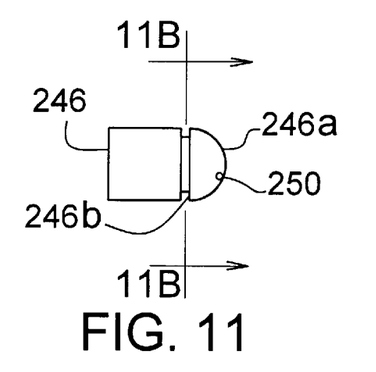
FIG. 11 is a side view of one preferred nozzle blaster of the present invention.
Figure 11A:
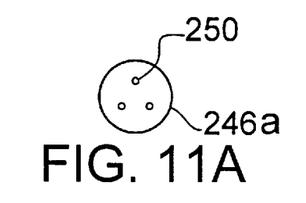
FIG. 11A is an end view of FIG. 11.
Figure 11B:
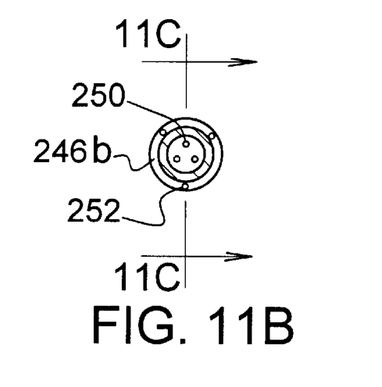
FIG. 11B is a sectional view taken along lines 11B—11B of FIG. 11.
Figure 11C:
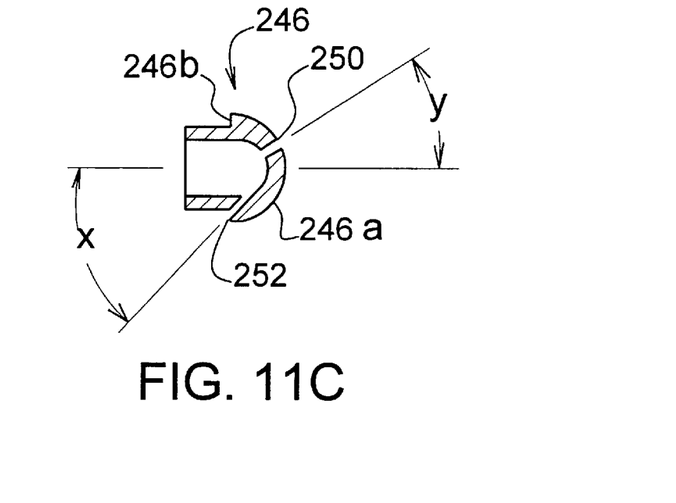
FIG. 11C is an enlarged sectional view taken along lines 11C—11C of FIG. 11B.

FIGS. 9A, 9B and 10 show another preferred embodiment which is a variation of the apparatus 116 as shown in FIGS. 6A–8B. In this embodiment the ball cutter 122 is replaced by a ball cutter 222. Ball cutter 222 is substantially identical to ball cutter 122 except in size. Ball cutter 222 has a diameter less than the diameter of the steel ball bearings 126 and, particularly ball 126a to which ball cutter 222 is attached in the same manner as ball cutter 122. Moreover, ball cutter 222 has a diameter greater than the thickness of the wall of well casing 12. In this embodiment, the ball cutter 222 is positioned to cut through the wall of the well casing 12, but will not extend into the surrounding earth's strata as the ball 126a will not pass through the cut in the wall casing 12.

It is realized that while the preferred embodiments of the invention have been disclosed herein, further modifications to the preferred embodiments will occur to those skilled in the art and such obvious modifications are intended to be within the scope and spirit of the present invention.

What is claimed is:

1. A method for penetrating a well casing and surrounding earth strata comprising the steps of:
   inserting an upset tubing having an elbow on an end thereof a preselected distance into a well casing;
   inserting a flexible shaft having cutting means on an end thereof into said upset tubing, said cutting means extending through said elbow;
   rotating said flexible shaft and said cutting means cutting a hole in said well casing;
   removing said flexible shaft and said cutting means from said upset tubing;
   inserting a flexible tube having a nozzle on an end thereof into the upset tubing and said channel;
   pumping a fluid into the flexible tube and nozzle; and,
   cutting an extension of said channel in said earth's strata.

2. The method of claim 1, said nozzle being a nozzle blaster, with a fluid chamber therein in fluid communication with said flexible tube, said nozzle blaster having a front conical portion and a rear base portion, said nozzle blaster having a plurality of first openings therein in said conical portion extending into said chamber, said first openings being directed forwardly of said nozzle blaster and a plurality of second openings in said base portion directed rearwardly of said nozzle blaster.

3. The method of claim 1, said cutting means including a cutter and means to prevent said cutter from extending into said strata after making a cut in a well casing.

4. The method of claim 3, said means to prevent said cutter from extending into said strata including an elbow at the terminating end of said upset tubing, said elbow being octagonally shaped with an inlet on a top surface thereof and an outlet opening on a side at a 90° angle from said inlet, said opening being larger at said inlet than said outlet, said flexible shaft having a plurality of balls at its cutting end with said cutter at a terminating end of said cutting end, said cutter having a maximum diameter less than a maximum diameter of at least an adjacent ball.

5. The method of claim 4, said cutter being a ball cutter.

6. An apparatus for cutting a hole in a well casing comprising:
   a cutter;
   a flexible shaft having said cutter on one end thereof;
   means to position said cutter at a preselected position within a well casing, said means to position said cutter includes an elbow at a terminating end of an upset tubing in a well casing through which said cutter is received therethrough, said elbow including a bowed channel between an inlet and an outlet, said bowed channel having a bottom portion, said bottom portion having an upslope towards said outlet.

7. The apparatus of claim 6 wherein said means to rotate includes a fluid motor coupled to said flexible shaft.

8. The apparatus of claim 7 wherein said means to rotate includes a speed reducer coupled to said fluid motor wherein said speed reducer is coupled to said flexible shaft.

9. The apparatus of claim 8 wherein said output of said speed reducer is from about 20 to 30 rpm.

10. The apparatus of claim 6, said elbow being octagonally shaped wherein said inlet is on one side thereof and said outlet is on another side at 90° angle from said inlet, said opening being larger at said inlet than said outlet.

11. The apparatus of claim 10, said cutter being a ball cutter, said flexible shaft having a plurality of balls at a cutting end with said ball cutter at a terminating end of said cutting end, said ball cutter having a maximum diameter less than a maximum diameter of at least an adjacent ball.

12. The apparatus of claim 6, said upslope being approximately 5°.

13. The apparatus of claim 6, said means to rotate said flexible shaft being a motor.

14. The apparatus of claim 13, including means to prevent rotation of said motor.

15. The apparatus of claim 14, said means to prevent rotation of said motor including a vertically extending motor detent insert, said motor detent insert having diametrically opposed slots which receive detent wings of said motor.

16. The apparatus of claim 6, said cutter being a ball cutter.

17. The apparatus of claim 6, said flexible shaft having a plurality of balls at a cutting end with said cutter at a terminating end of said cutting end, said cutter having a maximum diameter less than a maximum diameter of at least an adjacent ball.

18. An apparatus for cutting a hole in a well casing and then a lateral channel outwardly from the casing, the apparatus comprising:
   a cutter head, a flexible shaft and a motor, said flexible shaft being connected between the motor and the cutter head;
   a cutting nozzle and flexible hose;
   an elbow providing an inlet and outlet with a passageway therebetween for the cutter head and the flexible shaft;
   guide tracks aligned with the inlet to the passageway;
   said guide tracks guiding the motor for movement of the cutter head and the flexible shaft down the well casing to move the cutter head out the outlet into cutting engagement with the well casing when the motor drives the flexible shaft;

said elbow passageway being configured to guide said cutting nozzle and said flexible hose as the flexible hose is fed through the inlet and outlet so that the nozzle can cut the lateral passageway; and, said motor, flexible shaft and cutter head being removable from the elbow to be replaced by said nozzle and said flexible hose.

19. The apparatus of claim 18, said cutter head being a ball cutter.

20. The apparatus of claim 18, said elbow inlet being larger than said elbow outlet.

21. The apparatus of claim 18, said guide tracks having diametrically opposed slots and said motor having detent wings, said detent wings being received within said diametrically opposed slots.

22. The apparatus of claim 18, said elbow passageway including a bowed channel.

23. The apparatus of claim 18, said bowed channel having a bottom portion, said bottom portion having an upslope towards said outlet.

24. The apparatus of claim 23, said upslope being approximately 5°.

25. The apparatus of claim 18, said flexible shaft having a plurality of balls at its cutting end with said cutter head at a terminating end of said cutting end, said cutter head having a maximum diameter less than a maximum diameter of at least an adjacent ball.

26. The apparatus of claim 25, said cutter head being a ball cutter.

27. An apparatus for cutting a hole in a well casing and then a lateral channel leading outwardly from the well casing, the apparatus comprising:

upset tubing to be lowered down the well casing and having a lower end;

an elbow fixed to the lower end of the upset tubing, said elbow providing an inlet and an outlet with a passageway therebetween and the outlet facing the well casing;

a motor, flexible shaft and a cutter head, the flexible shaft drivingly connecting the motor to the cutter head, said flexible shaft having a plurality of balls at its cutting end with said cutter head at a terminating end of said cutting end, said cutter head having a maximum diameter less than a maximum diameter of at least an adjacent ball.

28. The apparatus of claim 27, said cutter head being a ball cutter.

29. The apparatus of claim 27, said inlet into said passageway being larger than said outlet.

30. The apparatus of claim 27, said elbow passageway including a bowed channel.

31. The apparatus of claim 30, said bowed channel having a bottom portion, said bottom portion having an upslope towards said outlet.

32. The apparatus of claim 31, said upslope being approximately 5°.

33. An apparatus for use with upset tubing having a lower end in a well casing to cut a hole in the wall of the casing and a lateral channel extending outwardly from the casing, the apparatus comprising:

an elbow to be mounted on the upset tubing at its lower end to be lowered into the well casing, said elbow providing an inlet and outlet with a passageway therebetween, said inlet opening upwardly in the upset tubing and said outlet opening outwardly toward the wall of the casing;

a motor, a flexible shaft and a cutter head, said flexible shaft extending between the motor and the cutter head to provide a rotary drive connection, said flexible shaft and cutter head being movable through the passageway to have the cutter head engage the well casing adjacent the outlet to cut a hole in the casing; and, a cutting nozzle and hose configured to be lowered into the elbow passageway to exit the outlet and cut the lateral channel outwardly from the hole by fluid pressure from the nozzle.

34. The apparatus of claim 33, said cutter head being a ball cutter.

35. The apparatus of claim 33 said passageway inlet being larger than said passageway outlet.

36. The apparatus of claim 33 said passageway including a bowed channel.

37. The apparatus of claim 36, said bowed channel having a bottom portion, said bottom portion having an upslope towards said outlet.

38. The apparatus of claim 37, said upslope being approximately 5°.

39. The apparatus of claim 33, said flexible shaft having a plurality of balls at its cutting end with said cutter head at a terminating end of said cutting end, said cutter head having a maximum diameter less than a maximum diameter of at least an adjacent ball.

\* \* \* \* \*